United States Patent [19]

Penzes

[11] 4,040,657
[45] Aug. 9, 1977

[54] VARIABLE-DENSITY VEHICLE GLARE SHIELD

[76] Inventor: Joyce P. Penzes, Rte. 116, Purdys, N.Y. 10578

[21] Appl. No.: 699,317

[22] Filed: June 24, 1976

[51] Int. Cl.² ............................................. B60J 3/00
[52] U.S. Cl. ................................................. 296/97 R
[58] Field of Search ............... 296/97 R, 97 H, 97 C, 296/97 F, 97 G

[56] References Cited
U.S. PATENT DOCUMENTS

| | | | |
|---|---|---|---|
| 3,321,628 | 7/1967 | Werner | 296/97 R |
| 3,415,569 | 12/1968 | Leevo | 296/97 R |
| 3,692,355 | 9/1972 | Hong | 296/97 H |

Primary Examiner—Philip Goodman
Attorney, Agent, or Firm—Karl H. Gross

[57] ABSTRACT

A variable-density vehicle glare shield has a mount which supports at least two transparent shields so that they can be individually swung to and from a position in front of the eyes of a driver of the vehicle. The shields are of different colors, e.g. one yellow and one blue. Either shield can be used by itself, or both shields can be used together, thereby obtaining not only a different color for the composite shield made up of two overlying individual shields, but also permitting the driver to vary the shield-color density in accordance with prevailing light conditions.

8 Claims, 3 Drawing Figures

VARIABLE-DENSITY VEHICLE GLARE SHIELD

BACKGROUND OF THE INVENTION

The present invention relates to a vehicle glare shield of the type commonly used on motor vehicles, boats, aircraft and the like. More particularly, it relates to a variable-density glare shield and, in particular, to a glare shield wherein the density can be selectively varied in accordance with the wishes and needs of an operator or user.

Such vehicle glare shields may be of the type which clips on to a sun visor or another part of the vehicle, or they may be directly installed on the vehicle body or some component of the vehicle. Many proposals for such glare shields have been made in the prior art, but few, if any, of these have found actual commercial use. The reason apparently has been that such devices were relatively complicated to manufacture and use, and were expensive, and also that they did not truly meet the needs of the motorist or other potential users.

Yet, there is a definite need for a simple, inexpensive and reliable glare shield of the general type under discussion. There is especially a need for such a glare shield which will afford the user as large as possible a measure of control over the glare-inhibiting function of the shield, so that the latter can be accomodated to the prevailing light conditions.

SUMMARY OF THE INVENTION

Accordingly, it is an object of the present invention to overcome disadvantages of the prior art and to provide a glare shield of the type under discussion which will afford the aforementioned, desirable characteristics.

More particularly, it is an object of the invention to provide such a glare shield which offers the user the feature of selectively variable density.

A further object of the invention is to provide a glare shield which affords the user the choice of shield colors, selectable by him at will.

Still another feature is to provide such a glare shield as set forth above, which is simple and reliable.

A concomitant object is to provide a glare shield of the aforementioned type which is inexpensive to produce and, hence, the inexpensively saleable so as to reach the widest possible market.

In keeping with the above abjects, and with others which will become apparent herafter, a feature of this invention resides in a glare shield for motor vehicles and other conveyances. Briefly state, my novel shield comprises at least two transparent shield elements each having a different color, and mounting means for mounting said shield elements for movement severally as well as jointly to and from a position in which a user may look through said shield elements so as to be shielded against glare by the same.

While the novel features which are considered to be characteristic of the invention are set forth in the claims, an embodiment of the invention — together with its method of use and advantages — is set forth in the description and the accompanying drawings.

DESCRIPTION OF A PREFERRED EMBODIMENT

Figure 1:
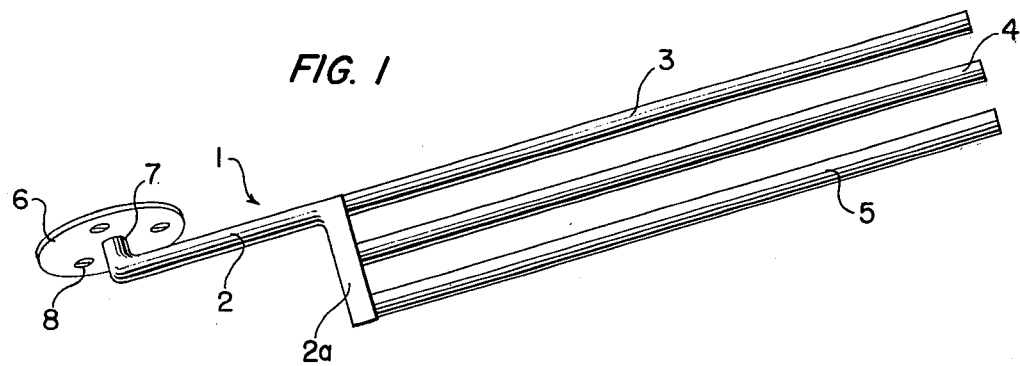
FIG. 1 is a front perspective of the mounting arrangement of my novel glare shield, according to one embodiment; the anti-glare elements themselves being omitted for clarity.
Figure 2:
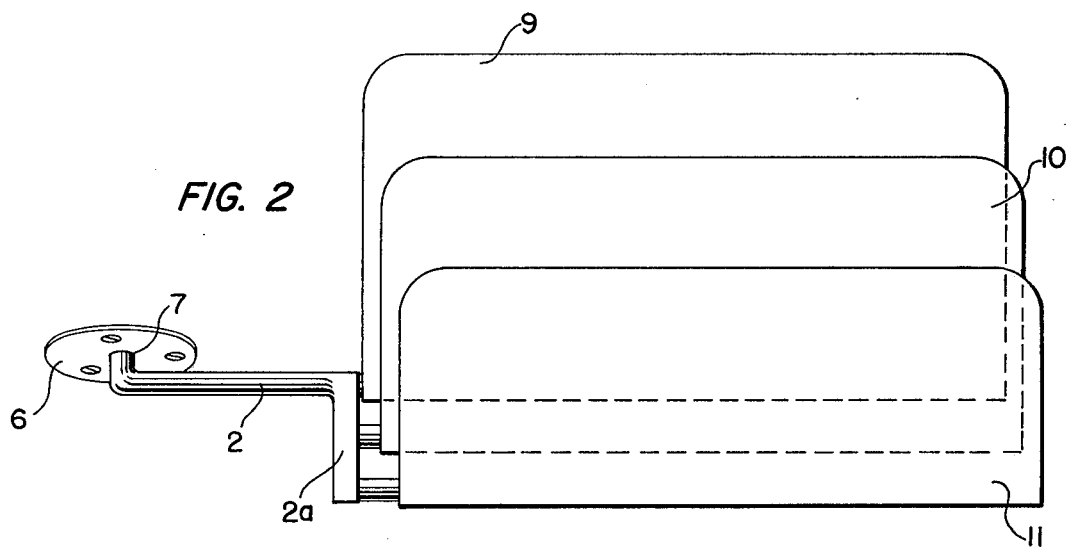
FIG. 2 is a view similar to FIG. 1, but illustrating the anti-glare elements in position on the mounting arrangement but located in their rest positions.
Figure 3:
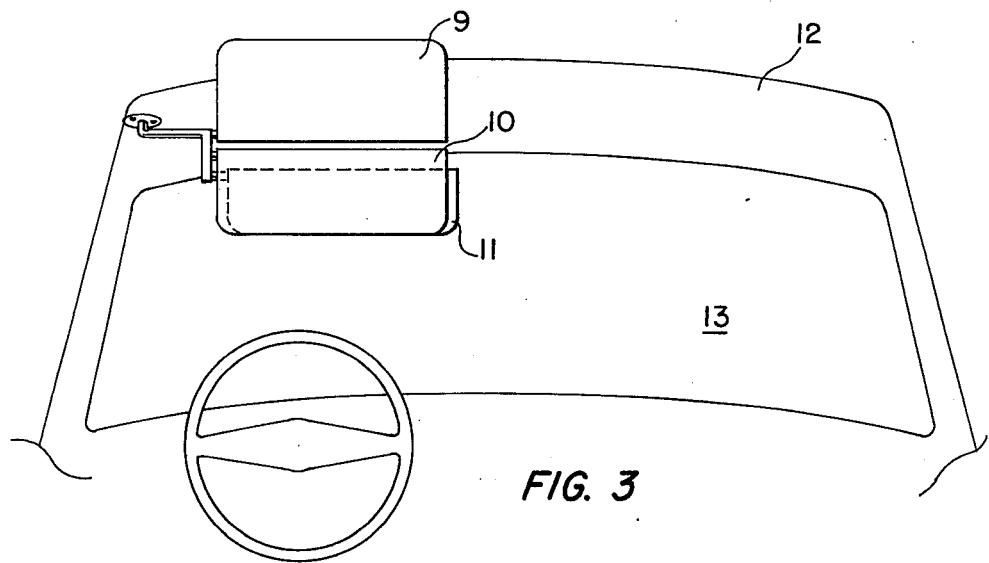
FIG. 3 shows the glare shield installed in a motor vehicle and in use.

The drawing shows a single, exemplary embodiment of the invention in FIGS. 1–3.

Reference numeral 1 identifies in toto a mounting member of my novel glare shield. This member has a base portion 2 provided at its free end 7 with a mounting flange 6 of circular (as illustrated) or other configuration. By way of example I have shown that flange 6 may have two or more holes 8 through which screws (not shown) are passed in order to secure the flange 6 to a part of a motor vehicle, as shown in FIG. 12 where the flange is mounted on the part 12 framing the windshield 13 of a motor vehicle passenger compartment.

Member 1 has an additional part 2a which is forked and in the illustrated embodiment has three arms 3, 4 and 5, respectively. However, this part of member 1 could also be merely bifurcated, or there could be more than the illustrated three arms. When flange 6 is mounted for use, the arms 3–5 are located — relative to the windshield — as illustrated in FIG. 3. The arms 3, 4 and 5 are mounted on part 2a so that they can turn relative thereto; they are preferably of non-circular cross-section.

Mounted on each arm 3–5 is an anti-glare element 9, 10 and 11, respectively. These elements are advantageously of a transparent synthetic plastic material, such as sheet acrylic, and have the general shape shown in FIG. 2, i.e., the general shape which is already well known from conventional vehicle sun visors. By virtue of the arrangement of the arms 3–5 relative to one another and to the windshield (see FIG. 3), the element 11 may be used by itself by moving it to the operating position shown in FIG. 3, or it may be used in combination with the element 10 (this is illustrated in FIG. 3) or in combination with the element 10 as well as the element 9. To make the elements 9–11 movable to and from their FIG. 3 operating position, they may be provided along one longitudinal edge with an elongated interior tunnel space, e.g. by bending the appropriate edge portion back upon itself in an arc until it forms the desired space with the remainder of the respective element. One of the arms 3–5 is then received in the space e.g. with a slight friction fit and if the cross-section of both the arm and the space is round or nearly so, the anti-glare element can be readily tilted relative to its associated arm. Of course, other ways of mounting the elements on the arms are also possible and will offer themselves to those skilled in the art. The currently preferred and illustrated embodiment shows each glare shield fixed on its respective arm to turn with, but not relative to, the associated arm.

The element 11, which can be used by itself, should be of a color which offers the lightest density. It is advantageous that this color be yellow, since many persons prefer the more cheerful appearance imparted to their surroundings on a bleak, overcast day, when the surroundings are viewed through the yellow element.

The element 10 may be blue, to offer a green color when it overlies element 11 (as in FIG. 3) and the surroundings are viewed through both elements jointly. Of course, element 10 could be green per se, or any other color so long as the color, when a person looks through both of the elements 11 and 10 jointly, will not be the darkest color attainable with the shield.

This darkest color is obtained when the element 9 — which is again of a color different from those of the elements 11, 10, or at least of a different shade of their colors — is superimposed on the elements 11, 10, so that a user will now view his surroundings through all three elements 9–11.

Thus, the shield according to my invention affords the user the possibility to select the density gradient — and thus the anti-glare effectiveness — of the shield at will, i.e., in accordance with ambient light conditions or with the conditions prevailing relative to oncoming traffic (e.g. strong sunlight glare from chrome parts of oncoming traffic).

The shield of the present invention thus avoids the prior-art disadvantages and offers the user a choice of selectable density gradient that heretofore did not exist in this field. Furthermore, the novel shield is simple and inexpensive to make and sell.

The novel anti-glare shield of the invention is susceptible of various modifications which are considered embraced within the scope of the appended claims. For example, material other than sheet acrylic could be used for the anti-glare elements, such as polystyrene or polyethylene. The member 1 can be made of metal or plastic material. The end 7 of member 1 neednot be fixedly connected to flange 6, but could be connected thereto via a ball-and-socket joint to make the member 1 swingable. The arrangement of the arms of member 1 could be so chosen that each of the anti-glare shield could be swung individually to working position and would not need to be used in conjunction with any other shield unless the user specifically so desires.

While the invention has been described and illustrated by way of an exemplary embodiment, it should be understood that the novel aspects which are sought to be protected by United States Letters Patent are set forth in particular in the appended claims, and that all such modifications as might offer themselves to persons of skill in the art to be considered encompassed by the scope of these claims.

I claim:

1. A variable-density vehicle glare shield, comprising at least two elongated transparent anti-glare shield elements each having a first and a substantially parallel second longitudinally extending edge portion, said elements each being of a different color and one of said elements having intermediate said edge portions a width which is greater than the width of the other element intermediate said edge portions thereof; and means connected to one of said edge portions of each element for mounting said elements adjacent an upper edge of a vehicle windshield for movement severally as well as jointly to and from a position in which a user may look through said elements so as to be shielded against glare, said mounting means mounting said elements so that when the same are jointly moved to said position the others of said edge portions are in registry with one another.

2. A glare shield as defined in claim 1, wherein said mounting means comprises a mounting element having a first portion connectable to a vehicle, and a second portion which is furcated and provided with at least two arms on each of which one of said shield elements is secured for pivotal movement relative to said first portion.

3. A glare shield as defined in claim 2, wherein said first portion has a free end provided with a mounting flange.

4. A glare shield as defined in claim 2, wherein said arms are so located relative to one another that said shield elements can each be moved individually to said position, and can both be moved to said position, at the will of a user.

5. A glare shield as defined in claim 1, wherein one of the glare shields is of a light first color and the other of said glare shields is of a darker second color.

6. A glare shield as defined in claim 1, wherein said mounting means comprises a mounting element having three parallel arms; and further comprising an additional glare shield, each of said glare shields being mounted on one of said arms for pivotal displacement to and from said position.

7. A glare shield as defined in claim 1, wherein said shield elements are of synthetic plastic material.

8. A glare shield as defined in claim 2, wherein each of said arms is pivotable relative to said second portion, and the associated glare shield is mounted on the respective arm for movement with the same.

* * * * *